(12) United States Patent
Catella

(10) Patent No.: US 7,871,682 B2
(45) Date of Patent: Jan. 18, 2011

(54) SUPPORT ASSEMBLY FOR COMPOSITE LAMINATE MATERIALS DURING ROLL PRESS PROCESSING

(75) Inventor: Luke A. Catella, Plain View, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 440 days.

(21) Appl. No.: 10/956,520

(22) Filed: Sep. 23, 2004

(65) Prior Publication Data

US 2006/0062950 A1    Mar. 23, 2006

(51) Int. Cl.
*B32B 1/02* (2006.01)
*B32B 1/08* (2006.01)

(52) U.S. Cl. .............. 428/35.2; 428/34.1; 428/35.7; 428/35.9; 428/515

(58) Field of Classification Search ............ 428/34.1, 428/34.2, 35.7, 35.9, 515
See application file for complete search history.

(56) References Cited

U.S. PATENT DOCUMENTS

| | | | | |
|---|---|---|---|---|
| 4,010,308 A | | 3/1977 | Wiczer | |
| 4,126,730 A | * | 11/1978 | Molari, Jr. | 428/412 |
| 4,132,755 A | | 1/1979 | Johnson | |
| 4,323,623 A | * | 4/1982 | Ahrens et al. | 442/267 |
| 4,681,651 A | * | 7/1987 | Brozovic et al. | 156/382 |
| 4,695,344 A | * | 9/1987 | Crane et al. | 156/242 |
| 5,052,906 A | * | 10/1991 | Seemann | 425/112 |
| 5,123,985 A | * | 6/1992 | Evans et al. | 156/213 |
| 5,439,635 A | | 8/1995 | Seemann | |
| 5,578,155 A | | 11/1996 | Kawaguchi | |
| 5,601,852 A | | 2/1997 | Seemann | |
| 5,702,663 A | | 12/1997 | Seemann | |
| 5,939,013 A | | 8/1999 | Han | |
| 2001/0002609 A1 | | 6/2001 | Dagher | |

* cited by examiner

*Primary Examiner*—Marc A Patterson
(74) *Attorney, Agent, or Firm*—Robin W. Edwards

(57) ABSTRACT

A composite laminate material is supported during the roll press processing thereof by an assembly having: first and second perforated films disposed adjacent to first and second opposing surfaces of a mixture of uncured resin and fibers defining the composite laminate material, a gas permeable encasement surrounding the mixture and the first and second films, a gas impervious envelope sealed about the gas permeable encasement, and first and second rigid plates clamped about the gas impervious envelope.

20 Claims, 3 Drawing Sheets

7,871,682 B2

SUPPORT ASSEMBLY FOR COMPOSITE LAMINATE MATERIALS DURING ROLL PRESS PROCESSING

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to composite laminate material fabrication. More specifically, the invention is an assembly used to support composite laminate materials during the roll press processing thereof at room temperature.

2. Description of the Related Art

Composite laminates consist of fibers embedded in cured resin. Typically, composite laminate parts are "laid up" in layers of fibers and flowable, uncured resin. The "wet" parts are then hand-tooled and placed in an autoclave to remove entrapped air, achieve a desired fiber-to-resin ratio, and cure the resin. This process has two drawbacks. First, the hand tooling is labor intensive and its effectiveness varies from operator to operator. Second, when parts are large, autoclave processing thereof is either impractical or impossible, thereby requiring the design of smaller parts that must be joined or otherwise assembled in order to achieve the ultimate composite laminate part. This results in increased cost and weaker structures as the assembly's joints are never as strong as the composite laminate components thereof.

SUMMARY OF THE INVENTION

Accordingly, it is an object of the present invention to provide an assembly that can be used to support a composite laminate material during roll press processing thereof in lieu of hand tooling and autoclave processing.

Another object of the present invention is to provide a support assembly for a composite laminate material that allows the composite laminate material to be placed under vacuum while undergoing a roll press process at room temperature.

In accordance with the present invention, an assembly supports a composite laminate material during the roll press processing thereof. First and second films are disposed adjacent to first and second opposing surfaces of a mixture of uncured resin and fibers defining the composite laminate material. Each of the first and second films is perforated therethrough to permit passage of the uncured resin. A gas permeable encasement surrounds the mixture and the first and second films. The encasement distributes a vacuum applied thereto throughout the encasement so that the vacuum is applied to the mixture through the first and second films. A gas impervious envelope is sealed about the gas permeable encasement. First and second rigid plates are clamped about the gas impervious envelope. The plates span the first and second opposing surfaces of the mixture.

DETAILED DESCRIPTION OF THE INVENTION

Figure 1:
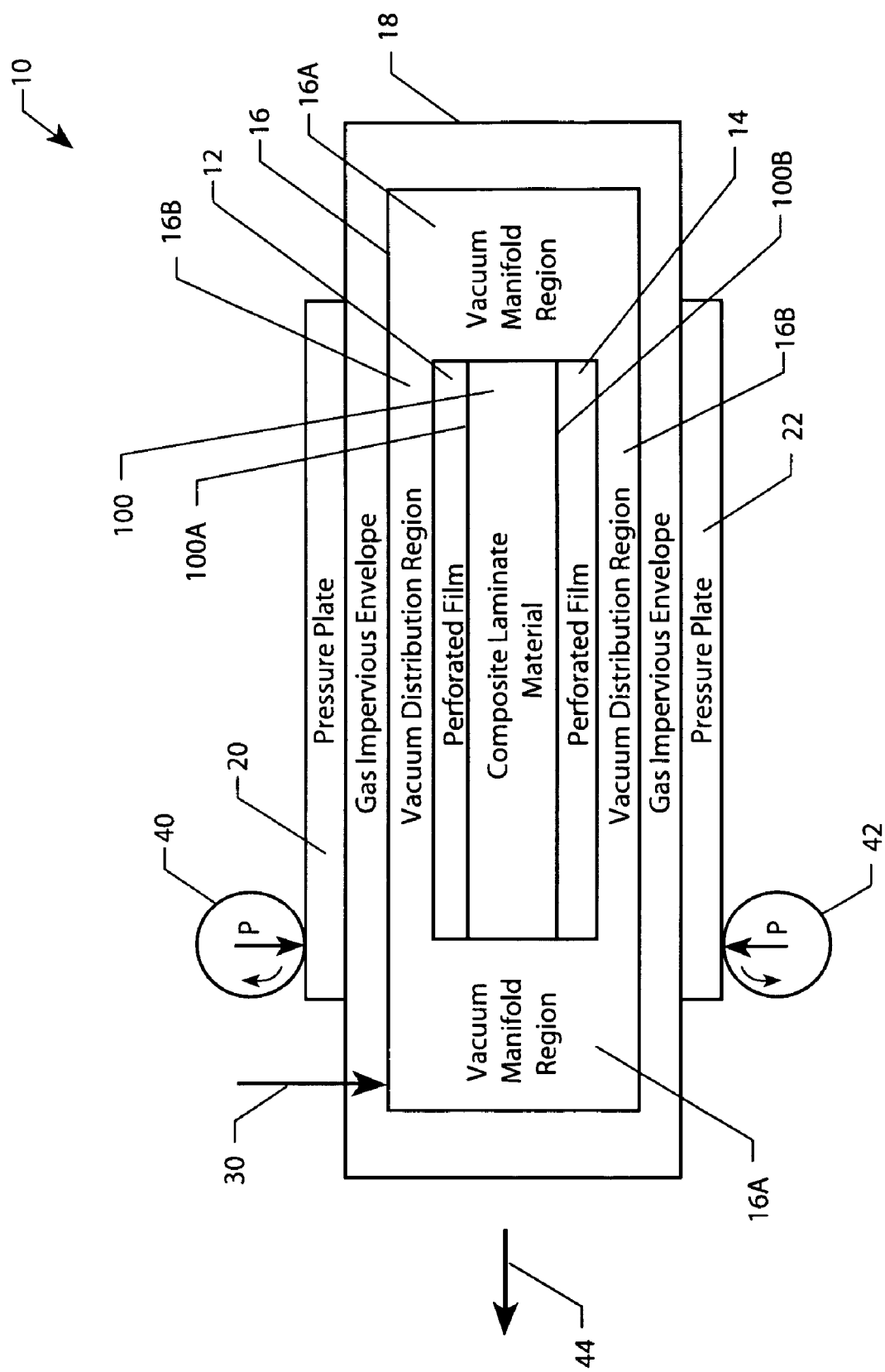
FIG. 1 is a schematic, cross-sectional view of a support assembly configured for roll press processing of a composite laminate material in accordance with the present invention.

Referring now to the drawings and more particularly to FIG. 1, a support assembly configured for the roll press processing of a composite laminate material 100 is shown and is referenced generally by numeral 10. Prior to the roll press process facilitated by support assembly 10, composite laminate material 100 is a mixture of uncured resin and fibers as would be well understood in the art. Typically, composite laminate material 100 represents interleaved, laid-up layers of uncured resin and fibers. Depending on the ultimate use of the cured version of composite laminate material 100, the fibers can be aligned in random or particular orientations to provide specific strength characteristics. The particular ratio of fiber-to-resin can also be adjusted in accordance with application requirements. Accordingly, it is to be understood that the uncured and cured forms of composite laminate material 100 are not limitations of the present invention.

Roll press processing of support assembly 10 and composite laminate material 100 produces a flat, constant-thickness part having opposing planar surfaces 100A and 100B. The part can be cured in a flat state or, as will be explained further below, can be draped over and cured on a three-dimensional mold surface to produce a shaped, three-dimensional part. An embodiment of the present invention will be described below that is particularly useful in facilitating the construction of a three-dimensional part.

In general, support assembly 10 includes perforated films 12 and 14 disposed adjacent to and spanning respective ones of opposing planar surfaces 100A and 100B, a gas permeable encasement 16 provided about films 12/14 and composite laminate material 100, a gas impervious envelope 18 sealed about encasement 16, and rigid pressure plates 20 and 22 sandwiching envelope 18 and spanning opposing planar surfaces 100A and 100B of composite laminate material 100. The essential features of each of the above elements will now be described with the understanding that realization of these features can be achieved with a variety of elements assembled in a variety of ways without departing from the scope of the present invention.

Films 12 and 14 are flexible, permeable to vacuum, and semi-permeable to liquid (e.g., perforated) to permit the passage therethrough of air and uncured resin from composite laminate material 100. The size and quantity of perforations can be adjusted for the particular resin used to make composite laminate material 100. For some applications, it may be preferred that films 12 and 14 are configured to let the uncured resin pressed out of composite laminate material 100 (i.e., during the roll press process) pass only one way through films 12 and 14. That is, once pressed through films 12 and/or 14, the uncured resin cannot be reintroduced into composite laminate material 100. In such cases, films 12 and 14 can be realized by various "wicking" materials such as GORETEX available from Dupont, and WRIGHTLON 7400 or RELEASE EASE 234TFP-1 available from Airtech International Inc. Films 12 and 14 can be naturally "non-stick" (or can be treated to be "non-stick") with respect to composite laminate material 100. This keeps support assembly 10 from bonding to composite laminate material 100 during the roll press process.

Gas permeable encasement 16 surrounds the combination of films 12/14 and composite laminate material 100. Functionally, encasement 16 is designed to distribute a vacuum pressure across planar opposing surfaces 100A and 100B. To do this, encasement 16 is defined by a vacuum manifold region 16A and a vacuum distribution region 16B. Manifold region 16A surrounds the perimeter of composite laminate material 100 such that a vacuum applied to region 16A (as indicated by arrow 30) is distributed about the perimeter of composite laminate material 100. Distribution region 16B is coupled to manifold region 16A and spans opposing planar surfaces 100A and 100B. Distribution region 16B receives the vacuum from region 16A and distributes same over surfaces 100A and 100B. The vacuum is applied to surfaces 100A and 100B through perforated films 12 and 14.

Regions 16A and 16B must be gas permeable, and can be the same or different materials. For example, region 16A can be any of a variety of known bleeder materials suitable for vacuum transmission such as fibrous media or materials comprised of synthetic or natural fibers. Such fibrous materials include fibrous cloths (e.g., cheese cloth) cotton, wool, polyester, rayon, and fiberglass. Other suitable materials include synthetic felt or a commercially-available resin infusion media. Region 16B can likewise be any of the above-mentioned materials, and is typically fiberglass, a synthetic felt, or a resin infusion media. As will be explained further below for a specific embodiment, if regions 16A and 16B are separate elements, distribution region 16B will typically extend past the entire perimeter of composite laminate material 100 and contact manifold region 16A all around composite laminate material 100. In addition to facilitating the distribution of vacuum over surfaces 100A and 100B, distribution region 16B can also serve to trap excess uncured resin that passes through films 12 and 14.

To retain vacuum pressure 30 applied to manifold region 16A, gas impervious envelope 18 is sealed about encasement 16. Typically, envelope 18 is a flexible, sealed bag that provides for the application of vacuum pressure 30 to manifold region 16A. Suitable materials for envelope 18 include a variety of gas impervious materials such as plastic and polyester-based films, a variety of which are well known in the art.

Rigid pressure plates 20 and 22 sandwich envelope 18 and its contents. More specifically, plates 20 and 22 span surfaces 100A and 100B and terminate over manifold region 16A all about the perimeter of composite laminate material 100. Plates 20 and 22 are bolted or otherwise clamped together prior to the commencement of roll press processing. Typically, plates 20 and 22 are clamped together while vacuum pressure 30 is applied to manifold region 16A.

In operation, with support assembly 10 and composite laminate material 100 configured as shown in FIG. 1, assembly 10 is fed into a roll press having top and bottom rollers 40 and 42, respectively, that apply an even pressure P to plates 20 and 22 as assembly 10 moves between rollers 40/42 in the direction of travel indicated by arrow 44. The spacing between rollers 40 and 42 must be adequate to (i) receive the support assembly 10 prior to roll press processing, and (ii) apply sufficient pressure P to press out entrapped air and excess uncured resin from composite laminate material 100 in order to yield the proper ultimate thickness and fiber-to-resin ratio for laminate material 100. At the conclusion of the roll press process, the composite laminate can be used as shaped by roll press processing of assembly 10 if a flat, two-dimensional part is being constructed. However, if a three-dimensional part is being constructed, the "bagged" assembly to include the envelope 18 is removed from plates 20 and 22, and is draped over a three-dimensional mold surface. Composite laminate material 100 in the "bagged" assembly is then allowed to cure in place on the mold surface as vacuum pressure 30 is continuously applied.

Figure 2:
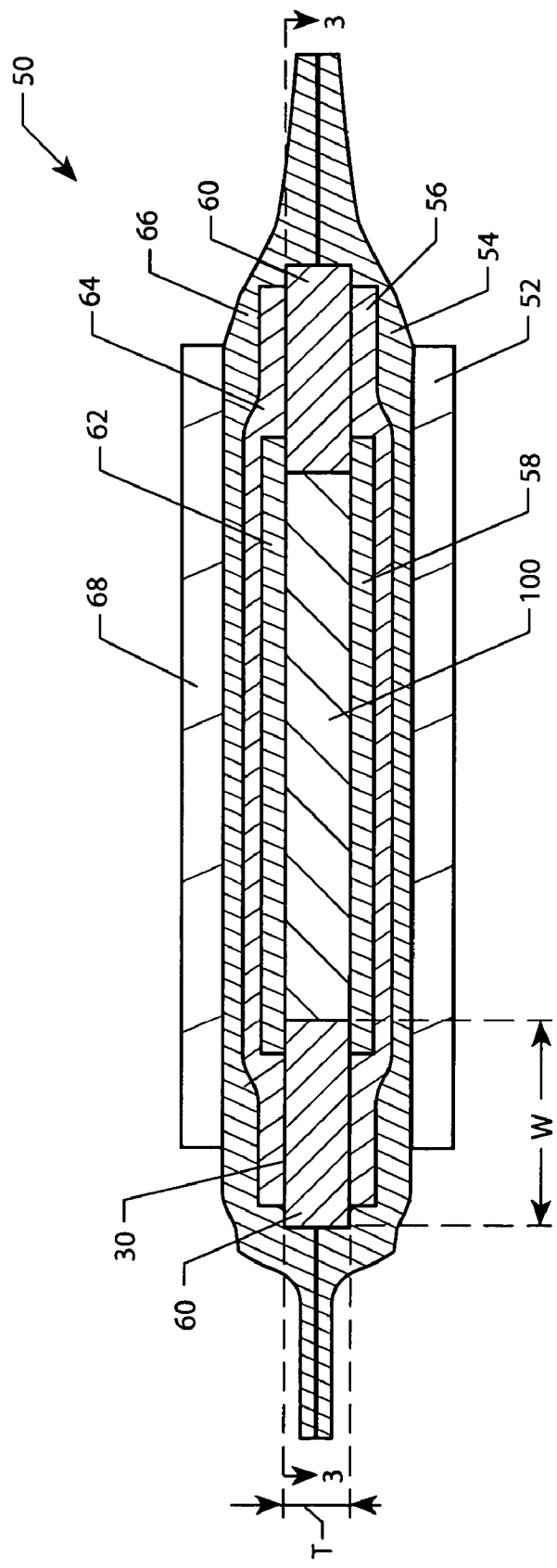
FIG. 2 is a cross-sectional view of an embodiment of the support assembly for a composite laminate material.
Figure 3:
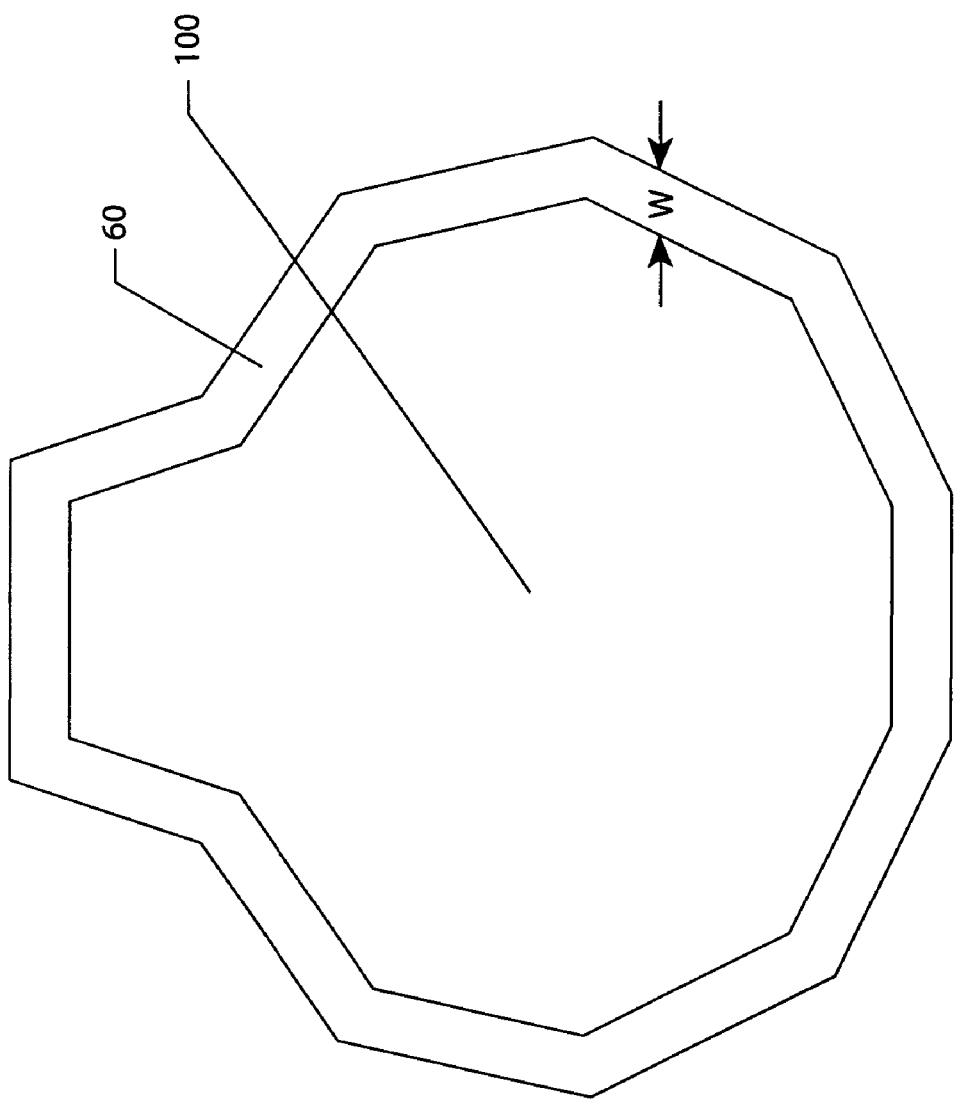
FIG. 3 is a plan view taken along line 3-3 of FIG. 2.

A particular embodiment of the present invention's support assembly is illustrated in a cross-sectional view in FIG. 2 and is referenced generally by numeral 50. Assembly 50 is built starting from a lower rigid pressure plate 52. A lower gas impervious material layer 54 (e.g., plastic, polyester, etc.) is laid on plate 52. A lower vacuum distribution layer 56 (e.g., fiberglass, synthetic felt, resin infusion media, etc.) is laid on layer 54. A lower perforated film layer 58 (e.g., a wicking material) is laid on layer 56. A bleeder material 60 is laid on layer 58 along the perimeter of a two-dimensional outline of composite laminate material 100 as best seen in FIG. 3. The width W of bleeder material 60 should be sufficient to allow a good vacuum-transfer coupling with distribution layer 56. The thickness T of bleeder material 60 can be approximately equal to the composite laminate material 100 in its uncured state. In this way, with bleeder material 60 in place on layer 58, bleeder material 60 defines the edges of composite laminate material 100 and serves as a thickness guide when laying up the uncured resin and fibers that comprise laminate material 100.

After composite laminate material 100 is laid up (in its uncured state), an upper perforated film layer 62 (e.g., wicking material) is laid adjacent composite laminate material 100. Perforated film layers 58 and 62 span the entirety of composite laminate material 100. Thus, the combination of film layers 58/62 and bleeder material 60 assembly define a reservoir for composite laminate material 100. Similar to film layers 12/14 (FIG. 1), film layers 58/62 can be (i) treated with a release agent to prevent the bonding thereof to composite laminate material 100, and (ii) one-way materials with respect to uncured resin passage therethrough.

Adjacent to film layer 62 is an upper vacuum distribution layer 64 that is similar to distribution layer 56. Distribution layers 56 and 64 should both span surfaces 100A and 100B and be coupled to bleeder material 60 all around composite laminate material 100. An upper gas impervious material layer 66 covers distribution layer 56 and is sealed (e.g., via heat seal, adhesive, etc.) to lower gas impervious material layer 54. An upper rigid pressure plate 68 spans surfaces 100A and 100B and typically terminates over bleeder material 60. Plates 52 and 68 can be bolted or clamped together as vacuum pressure 30 is applied to bleeder material 60.

As mentioned above, bleeder material 60 (and, in general, manifold region 16A) can be used to define or pre-shape the two-dimensional outline for composite laminate material 100. The two-dimension outline could be defined prior to the placement of bleeder material 60. That is, one or more of layers 54, 56, 58, 62, 64 and 66 can be cut to form a template that defines the desired two-dimensional outline. Note that depending on the layer, additional offset material may be required beyond the template outline for the composite laminate material.

The above-described pre-shaping feature is particularly useful when the ultimate cured composite laminate part defines a three-dimensional surface. This is because the flexible nature of layers 54, 56, 58, 62, 64 and 66 allow them to be draped over a three-dimensional mold surface, and then cut or scribed to define the edges of the mold surface. Then, when the cut/scribed layer is laid flat (as it would be in assembly 50) the cut/scribed outline is a two-dimensional representation of the three-dimensional mold surface. Since particular fiber orientations may be required for the ultimate part, the pre-shaping feature allows appropriate ones of pre-shaped layers to be marked or annotated with correct fiber orientation to facilitate the lay up process.

The advantages of the present invention are numerous. The pressure plate/vacuum bag support assembly provides for roll press processing of composite laminates at room temperatures and pressures. The support assembly eliminates the need for hand tooling of laid up composite laminates and also eliminates the need for autoclave processing. Large two-dimensional and three-dimensional constant-thickness composite laminate parts can be made using the present invention.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. An assembly for supporting composite laminate materials during the roll press processing thereof, comprising:
   a bleeder material adapted to be disposed about the entire periphery of a mixture of uncured resin and fibers wherein first and second opposing surfaces of the mixture are defined, the bleeder material being gas permeable;
   first and second films adapted to be disposed adjacent to the first and second opposing surfaces of the mixture, each of the first and second films being perforated therethrough to permit passage of the uncured resin;
   a first gas permeable material layer disposed adjacent to and extending beyond the periphery of the first film and in contact with the bleeder material about the entire periphery of the mixture;
   a second gas permeable material layer disposed adjacent to and extending beyond the periphery of the second film and in contact with the bleeder material about the entire periphery of the mixture, wherein a vacuum applied to the bleeder material is distributed throughout the first and second gas permeable material layers and is applied to the mixture through the first and second films, and wherein a sub-assembly is defined by (i) the bleeder material, (ii) the first and second gas permeable material layers, and (iii) the first and second film layers;
   a gas impervious bag sealed about the sub-assembly; and
   first and second rigid plates clamped about the gas impervious bag with the first and second rigid plates spanning the first and second opposing surfaces of the mixture and terminating over the bleeder material.

2. An assembly as in claim 1 wherein the thickness of said bleeder material is approximately equal to the thickness of the mixture.

3. An assembly as in claim 1 wherein the first and second films only permit one-way passage therethrough of the uncured resin from the mixture.

4. An assembly as in claim 1 wherein the bleeder material is selected from the group consisting of fibrous materials, synthetic felt, and resin infusion media.

5. An assembly as in claim 1 wherein the first and second gas permeable material layers are selected from the group consisting of fibrous materials, synthetic felt, and resin infusion media.

6. An assembly as in claim 1 wherein the bleeder material defines a two-dimensional outline for the mixture.

7. An assembly as in claim 6 wherein the two-dimensional outline is defined by a three-dimensional surface.

8. An assembly as in claim 6 wherein at least one of the first film, the second film, the first gas permeable material layer, the second gas permeable material layer, and the gas impervious bag, forms a template for the two-dimensional outline.

9. An assembly for supporting composite laminate materials during the roll press processing thereof, comprising:
   first and second films adapted to be disposed adjacent to first and second opposing surfaces of a mixture of uncured resin and fibers, each of the first and second films being perforated therethrough to permit passage of the uncured resin;
   a gas permeable encasement surrounding the mixture and the first and second films for distributing a vacuum applied to the encasement throughout the encasement, wherein the vacuum is applied to the mixture through the first and second films, the gas permeable encasement comprising a bleeder material adapted to be disposed about the periphery of the mixture of resin and uncured fibers, the bleeder material being gas permeable;
   a gas impervious envelope sealed about the gas permeable encasement; and
   first and second rigid plates clamped about the gas impervious envelope with the first and second rigid plates spanning the first and second opposing surfaces of the mixture.

10. An assembly as in claim 9 wherein the first and second films only permit one-way passage therethrough of the uncured resin from the mixture.

11. An assembly as in claim 9 wherein the gas permeable encasement comprises at least one material selected from the group consisting of fibrous materials, synthetic felt, and resin infusion media.

12. An assembly as in claim 9 wherein the gas permeable encasement defines a two-dimensional outline for the mixture.

13. An assembly as in claim 12 wherein the two-dimensional outline is defined by a three-dimensional surface.

14. An assembly as in claim 12 wherein at least one of the first film, the second film, and the gas permeable envelope, forms a template for the two-dimensional outline.

15. An assembly for supporting composite laminate materials during the roll press processing thereof, comprising:
   a reservoir of constant depth filled with a mixture of layers of uncured resin and layers of fibers wherein substantially parallel first and second opposing planar surfaces of the mixture are defined, said reservoir defined by (i) sides made from a bleeder material that is gas permeable, and (ii) a top and bottom made from first and second films, respectively, disposed adjacent to the first and second opposing planar surfaces of the mixture, each of the first and second films being perforated therethrough to permit one-way passage of the uncured resin from the mixture through the first and second films;
   a first gas permeable material layer disposed adjacent to and extending beyond the periphery of the first film and in contact with the bleeder material about the entire periphery of the mixture;

a second gas permeable material layer disposed adjacent to and extending beyond the periphery of the second film and in contact with the bleeder material about the entire periphery of the mixture, wherein a vacuum applied to the bleeder material is distributed throughout the first and second gas permeable material layers and is applied to the mixture through the first and second films, and wherein a sub-assembly is defined by (i) the reservoir, and (ii) the first and second gas permeable material layers;

a gas impervious bag sealed about the sub-assembly; and first and second rigid plates clamped the gas impervious bag with the first and second rigid plates spanning the first and second opposing planar surfaces of the mixture and terminating over the bleeder material.

16. An assembly as in claim 15 wherein the bleeder material is selected from the group consisting of fibrous materials, synthetic felt, and resin infusion media.

17. An assembly as in claim 15 wherein the first and second gas permeable material layers are selected from the group consisting of fibrous materials, synthetic felt, and resin infusion media.

18. An assembly as in claim 15 wherein the bleeder material defines a two-dimensional outline for the mixture.

19. An assembly as in claim 18 wherein the two-dimensional outline is defined by a three-dimensional surface.

20. An assembly as in claim 18 wherein at least one of the first film, the second film, the first gas permeable material layer, the second gas permeable material layer, and the gas impervious bag, forms a template for the two-dimensional outline.

* * * * *